US 7,321,888 B2

(12) United States Patent
Day et al.

(10) Patent No.: US 7,321,888 B2
(45) Date of Patent: Jan. 22, 2008

(54) METHOD AND SYSTEM FOR DYNAMIC JOIN REORDERING

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 10/660,166

(22) Filed: Sep. 11, 2003

(65) Prior Publication Data

US 2005/0060292 A1   Mar. 17, 2005

(51) Int. Cl.
*G06F 17/30* (2006.01)
(52) U.S. Cl. .................. 707/2; 707/3; 707/5; 707/100; 707/104.1
(58) Field of Classification Search ................ 707/1–4, 707/102
See application file for complete search history.

(56) References Cited

U.S. PATENT DOCUMENTS

| | | | | |
|---|---|---|---|---|
| 5,345,585 A * | 9/1994 | Iyer et al. | ....................... | 707/2 |
| 5,724,568 A * | 3/1998 | Bhargava et al. | ............... | 707/2 |
| 6,377,943 B1 * | 4/2002 | Jakobsson | ...................... | 707/2 |
| 6,397,204 B1 * | 5/2002 | Liu et al. | ....................... | 707/2 |
| 6,442,539 B1 * | 8/2002 | Amundsen et al. | ............ | 707/2 |
| 6,487,549 B1 * | 11/2002 | Amundsen | ..................... | 707/3 |
| 6,502,089 B1 * | 12/2002 | Amundsen et al. | ............ | 707/2 |
| 6,564,204 B1 * | 5/2003 | Amundsen et al. | ............ | 707/2 |
| 6,754,652 B2 * | 6/2004 | Bestgen et al. | ................ | 707/3 |
| 2002/0188600 A1 * | 12/2002 | Lindsay et al. | ................ | 707/3 |
| 2002/0198867 A1 | 12/2002 | Lohman et al. | | |
| 2003/0126127 A1 * | 7/2003 | Abdo | ........................... | 707/4 |
| 2003/0187831 A1 * | 10/2003 | Bestgen et al. | ................ | 707/3 |
| 2004/0010488 A1 * | 1/2004 | Chaudhuri et al. | ........... | 707/3 |
| 2004/0210563 A1 * | 10/2004 | Zait et al. | ...................... | 707/3 |
| 2005/0091196 A1 * | 4/2005 | Day et al. | ...................... | 707/3 |

OTHER PUBLICATIONS

Don Chamberlin, "A Complete Guide to DB2 Universal Database," 1988 by Morgan Kaufmann Publisher, Inc. ISBN 1-55860-482-0, Chapter 7.5.1, Conservative Binding Semantics, pp. 453-455.
"SQL Package Creation and Distribution," IBM Technical Disclosure Bulletin, vol. 34, No. 7A, Dec. 1991.
Said Elnaffar et al., "Today's DBMSs: How autonomic are they?" Proceedings of the 14th International Workshop on Database and Expert Systems Applications (DEXA '03), Sep. 2003.

(Continued)

*Primary Examiner*—Cam Y. Truong
*Assistant Examiner*—Michael D Pham
(74) *Attorney, Agent, or Firm*—Wood, Herron & Evans, LLP

(57) ABSTRACT

A database engine and a system running a database engine utilize a dynamic join reordering feature to change the order of two or more join operations while a query is executing. The database engine starts execution of the query with an initial join order setting but monitors the execution of the query to determine whether the initial join order or some other join order would provide better runtime performance. If another join order would provide better performance, then the database engine can change the join order during query execution and complete the query using the new join order.

8 Claims, 9 Drawing Sheets

OTHER PUBLICATIONS

Surajit Chaudhuri, "An Overview of Query Optimization in Relational Systems," Proceedings of the 17th ACM Sigact-Sigmod-Sigart Symposium on Principles of Database Systems, Seattle, WA, Jun. 1998.

Goetz Graefe, "Query Evaluation Techniques for Large Databases," ACM Computing Surveys, vol. 25, No. 2, Jun. 1993.

Interim Guidelines for Examination of Patent Applications for Patent Subject Matter Eligibility; Annex IV; pp. 50-57; Nov. 22, 2005.

Kabra, Navin and DeWitt, David J., "Efficient Mid-Query Optimizations of Sub-Optimal Query Execution Plans." Jun. 1998, ACM Press, pp. 106-117.

D. Chamberlin, "A complete guide to DB2 universal database (excerpt)," Morgan Kaufmann Publishers, USA, XP002316820.

* cited by examiner

| Table X | |
|---|---|
| j1 | j2 |
| a | 0 |
| b | 1 |
| c | 2 |
| d | 3 |
| e | 4 |
| f | 5 |
| g | 6 |
| h | 7 |
| i | 8 |
| j | 9 |

702

| Table Y |
|---|
| j1 |
| a |
| a |
| b |
| b |
| c |
| c |
| d |
| d |
| e |
| e |
| f |
| f |
| g |
| g |
| h |
| h |
| i |
| i |
| j |
| j |

703

| Table Z |
|---|
| j2 |
| 11 |
| 11 |
| 12 |
| 12 |
| 13 |
| 13 |
| 14 |
| 14 |
| 15 |
| 15 |
| 16 |
| 16 |
| 17 |
| 17 |
| 18 |
| 18 |
| 19 |
| 19 |
| 20 |
| 20 |

METHOD AND SYSTEM FOR DYNAMIC JOIN REORDERING

FIELD OF THE INVENTION

The invention relates to database management systems, and in particular, to join ordering utilized in such systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the "query optimizers" utilized in many conventional database management systems. The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

Queries which the optimizer can handle often include Join operations of various types. For example, an Inner Join between the two tables will result in only the records matching certain selection criteria to be returned to a user. An outer join, such as a Left Join of Table A and Table B (according to a set of selection criteria) will return all matching records as well as those records in Table A not having a match in Table B. The matching records will have the values of all their fields populated by the data from Table A and Table B. However, the non-matching records from Table A will have a NULL, or other default character, in the fields from Table B. Another outer join, such as a Right Join of Table A and Table B will also return all the matching records but, unlike the Left Join, will return those records in Table B not having a matching record in Table A. Another join type is a Left Exception Join of Table A and Table B. In this instance, the result set will consist of those records in Table A for which no matching record in Table B exists. A Right Exception Join is available as well. Within the field of SQL queries, a number of different but synonymous terms are used. For purposes of simplicity, within the present description, a Left Join and Left Outer Join are equivalent terms and Right Join and Right Outer Join are equivalent terms also. Furthermore, an Inner Join and EquiJoin are equivalent terms as well.

One area that optimizers can particularly optimize a query plan having these join operations involves what is known as "join order". A query plan can include a query that involves joining of three or more tables. Because a single join is limited to accessing two tables, such multi-table joins are performed in sequence according to a particular order. For example, a query that involves joining tables A, B and C can often be performed as a join of table A and B followed by a join of table A and C. Alternatively, in many instances, the same query can be performed as a join of Table A and C followed by the join of Table A and B.

Therefore, to investigate join order, conventional optimizers evaluate certain characteristics about tables B and C to attempt to determine which join to perform first, or in other words, the optimizer selects a "join order" for the query. In the past, optimizers have looked at such characteristics, for example, as how many records are in a table and how many duplicate records exist in a table column. These characteristics can provide some indication of whether one particular join order might be better than another but provide far from perfect results. One problem with current optimization techniques is that because optimization occurs before executing the query, these techniques are applied without any knowledge or understanding about how each join operation will perform during runtime given the particular table data involved.

In particular, during runtime, one join operation may have a high fan-out rate in which each record of table A matches a plurality of records in table B. If this join is performed first, then each of these matching records will need to be joined to table C thereby requiring a significant number of intermediate operations. Conversely, the other join operation may have a high fan-in rate in which each record of table A matches very few records in table C. If this join operation is performed first, then only a few records have to be joined with table B, thereby saving a number of intermediate operations.

Traditional optimizers, however, do not provide the capability to evaluate runtime performance when selecting a join order for a query and, therefore, can often adversely impact query performance by selecting a poor join order for the query. Accordingly, there is an unmet need in the prior art for optimizing join ordering in a manner which considers runtime performance of a query.

SUMMARY OF THE INVENTION

Embodiments of the present invention utilize a dynamic join reordering feature to change the order of two or more join operations while a query is executing. A database engine starts execution of the query with an initial join order setting but monitors the execution of the query to determine whether the initial join order or some other join order would provide better runtime performance. If another join order would provide better performance, then the database engine can change the join order during query execution and complete the query using the new join order. During runtime, the database engine can monitor statistics such as fan-in and fan-out for each join operation of the query to determine the join order that will provide better performance results based on the actual table data being encountered while executing the query.

One aspect of the present invention relates to a method for monitoring a query during runtime wherein the query involves a plurality of join operations. In accordance with this aspect, the query is executed, according to a first join order and concurrent with running the query, performance statistics are collected about each of the join operations.

Another aspect of the present invention relates to a method for optimizing a query join order during runtime in which the query involves a plurality of join operations. In accordance with this aspect, the query is ran, or executed, according to a first join order. Concurrent with running the query, statistics are collected about each of the join operations; and based on the collected statistics, a preferred join order is selected, while running the query, such that the query continues to run according to the preferred join order.

Yet another aspect of the present invention relates to an apparatus for executing a query. This apparatus includes at least one processor, a memory coupled with the at least one processor, and a database engine residing in the memory and executed by the at least one processor. The database engine is configured to run a query involving a plurality of join operations according to a first join order; and, concurrent with running the query, collect statistics about each of the join operations.

A further aspect of the present invention relates to a computer-readable medium bearing instructions for optimizing a query join order during runtime, this query involving a plurality of join operations. These instructions are arranged, upon execution thereof, to cause one or more processors to perform the steps of: a) running the query according to a first join order; b) concurrent with running the query, collecting statistics about each of the join operations; and c) based on the collected statistics, selecting a preferred join order, while running the query, such that the query continues to run according to the preferred join order.

BRIEF DESCRIPTION OF THE DRAWINGS

FIG. 7 depicts a plurality of exemplary tables that help illustrate different SQL statements.

DETAILED DESCRIPTION

As mentioned above, the embodiments discussed hereinafter utilize a database engine and optimizer framework that support the dynamic reordering of join order when executing a query. The database engine, by monitoring the performance of different join operations during the execution of the query, can select a join order to improve the performance of the query. A specific implementation of such a database engine and optimizer framework capable of supporting join reordering in a manner consistent with the invention will be discussed in greater detail below. However, prior to a discussion of such a specific implementation, a brief discussion will be provided regarding an exemplary hardware and software environment within which such an optimizer framework may reside.

Hardware/Software Environment

Figure 1:
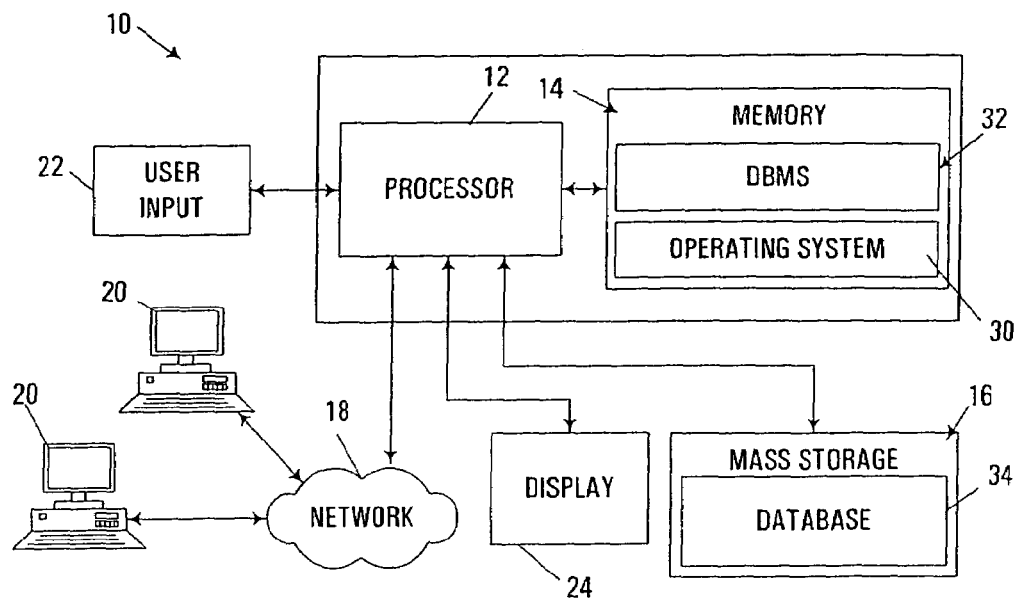
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system incorporating dynamic join reordering consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
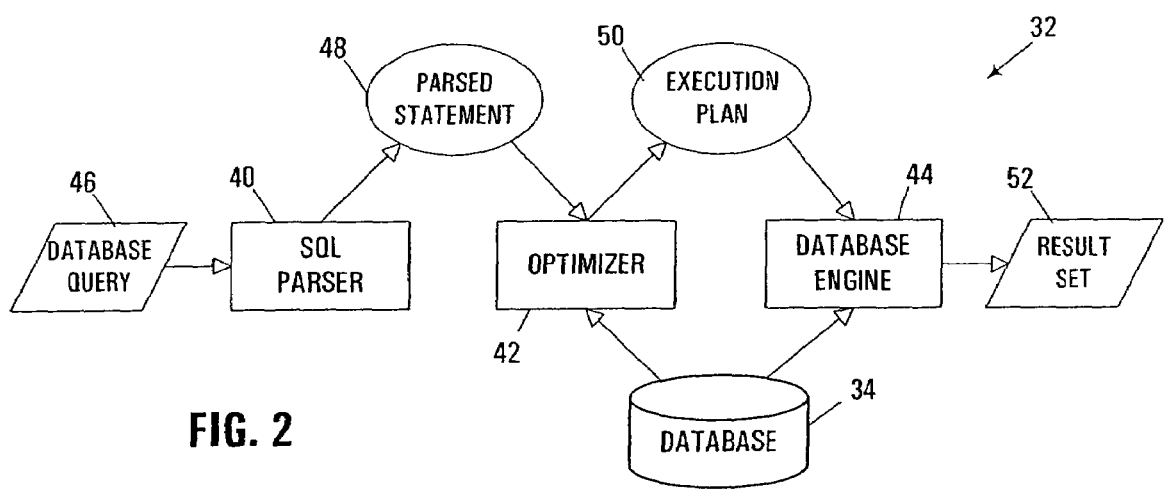
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Execution of Joins According to a Particular Order

Before describing an exemplary method and system for providing dynamic join reordering according to embodiments of the present invention, a brief description of how multi-table joins are performed by a database engine is provided to aid in the understanding of what performance statistics can be collected about various join operations and how such statistics can be collected.

Utilizing the tables 702, 703, 704 of FIG. 7, operation of an exemplary SQL join can be described, such as the following inner join:

```
SELECT * from X, Y, Z
WHERE X.j1 = Y.j1 AND X.j2 = Z.j2
```

Because of the two different selection criteria in the "WHERE" clause, this query results in two different joins: X to Y, and X to Z. In the past, the optimizer would decide in which the order these joins are performed before execution of the query. If the optimizer decided to join X to Y first, the join would fan-out to 20 records since each of the 10 values of X.j1 joins to two values of Y.j1. If the optimizer decided to join X to Z first, then the join would fan-in to 0 records because there are no records in which X.j2 matches to Z.j2.

In this scenario, the performance of the query would be greatly increased if X is joined to Z before being joined to Y. Following that order, the query would fan-in to zero records from the first join and Y would not have to be accessed at all. If X were joined to Y first, however, then the resulting 20 records cause 20 touches of Z even though each record will eventually be discarded because the Z join condition results in no matching records.

As mentioned earlier, current methods of optimizing the join order for queries before runtime are not effective with the tables 702, 703, 704 of FIG. 7. One conventional method for determining join order uses the average number of duplicate join values to select the best join order (i.e., the table with the lower average is joined first). In this case, both Y and Z have the same average number of duplicate values (i.e., 2). Another conventional method uses the number of records in the table to determine join order; again this is unhelpful because Y and Z have the same number of records (i.e., 20). Thus, these conventional techniques are unable to predict a best join order before query execution.

Instead of requiring the join order to be predicted before the query runs, embodiments of the present invention include a database engine that monitors the query while it is running. By analyzing the query performance while it is running, the database engine can dynamically adjust the join order if appropriate.

Figure 3:
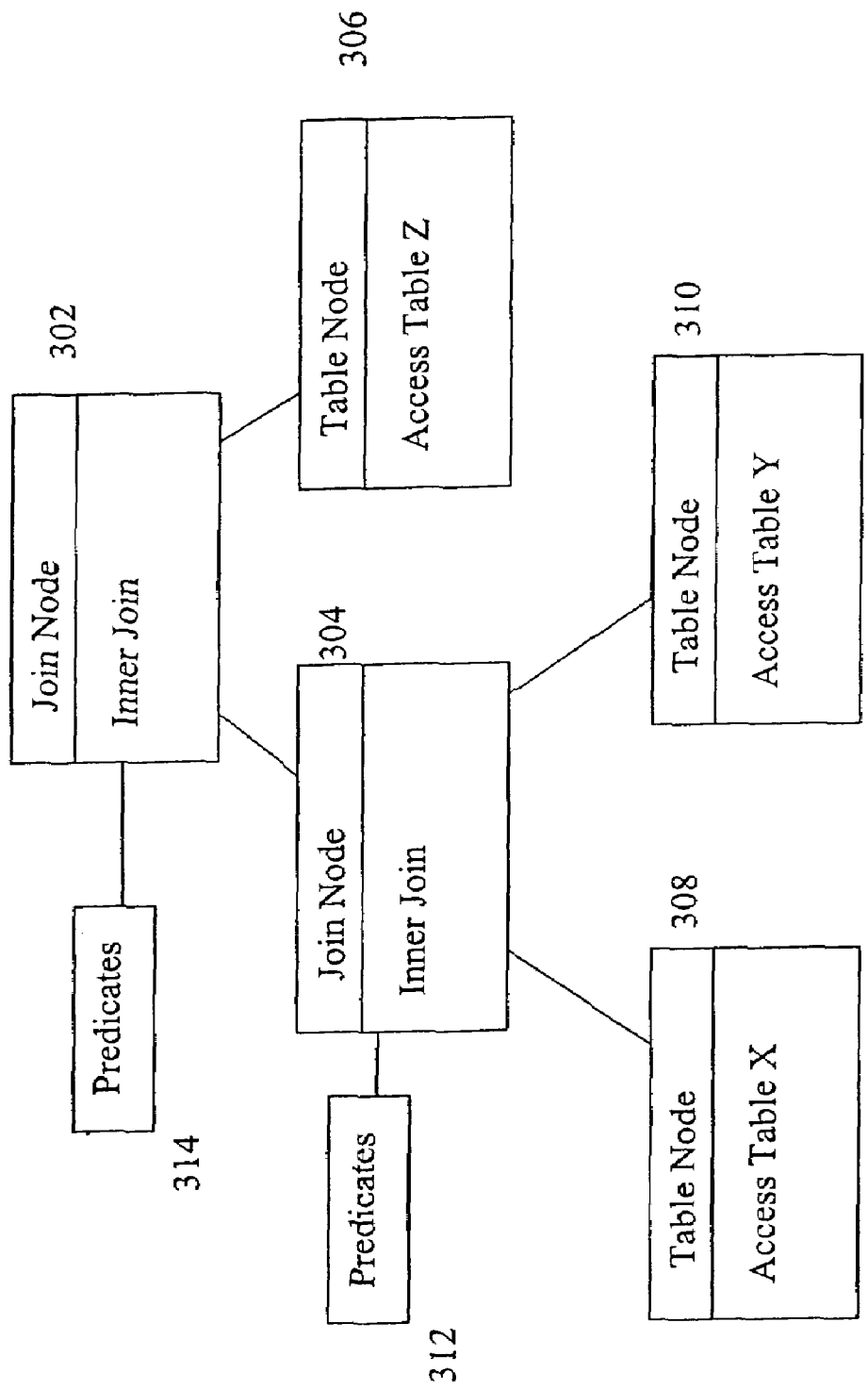
FIG. 3 illustrates an exemplary tree graph representing a multi-join query having a particular join order.

The above SQL statement can be represented as the tree graph of FIG. 3. This representation is helpful in understanding how fan-in can be monitored during a query execution and how the join order can be easily changed.

In operation, the top join node 302 travels to its left child node 304 looking for a first record. The second join node 304 is encountered which also travels to its left child node 308 looking for a first record. Thus, the first record from table X is retrieved. The logic of the join node 304 then travels to the right child node 310 to locate a record in table Y which satisfies the selection criteria 312 of the query. When a matching record is identified, that record is returned to the top join node 302 where the logic of the join node 302 travels to its right child node 306 to find a record in table Z which satisfies the selection criteria 314 of the query. All records in table Z are scanned by the logic of the top join node 302 and then processing returns back to the join node 304 that ensures all records in table Y are scanned for the current record retrieved from table X. Once all records in table Y are scanned, and any matches are processed further by the top join node 302, the second join node 304 returns to the left child node 308 to retrieve the next record from table X and repeats the sequence.

In performing these operations on the tables 702, 703, 704 of FIG. 7, for each record in table X, two records are matched in table Y and these 20 records are used to scan table Z, resulting in table Z being accessed, or touched, 20 times. However, no matches are found in table Z, so no records are returned in the result set.

During the execution of the query, the database engine can keep statistics about the results of the different join operations at each step. For example, the top join node 302 is considered to be a join from X to Z, or X→Z, and the bottom join node 304 is considered to be a join from X to Y, or X→Y. The database engine can keep statistics related to which join operation results in fan-out and which has a tendency to cause fan-in. Useful statistics can include data such as a) the number of records retrieved so far from table X; b) the number of records discarded, or non-selected, by operation of the X to Y join (i.e., X-Y fan-in); c) the number of records discarded, or non-selected, by operation of the X to Z join (i.e., X-Z fan-in; d) the fan-out results of the X to Y join; and e) the fan-out results of the X to Z join. From these statistics, it can become apparent that, in this instance, the join of X to Y is resulting in fan-out while the join of X to Z is resulting in fan-in.

Figure 4:
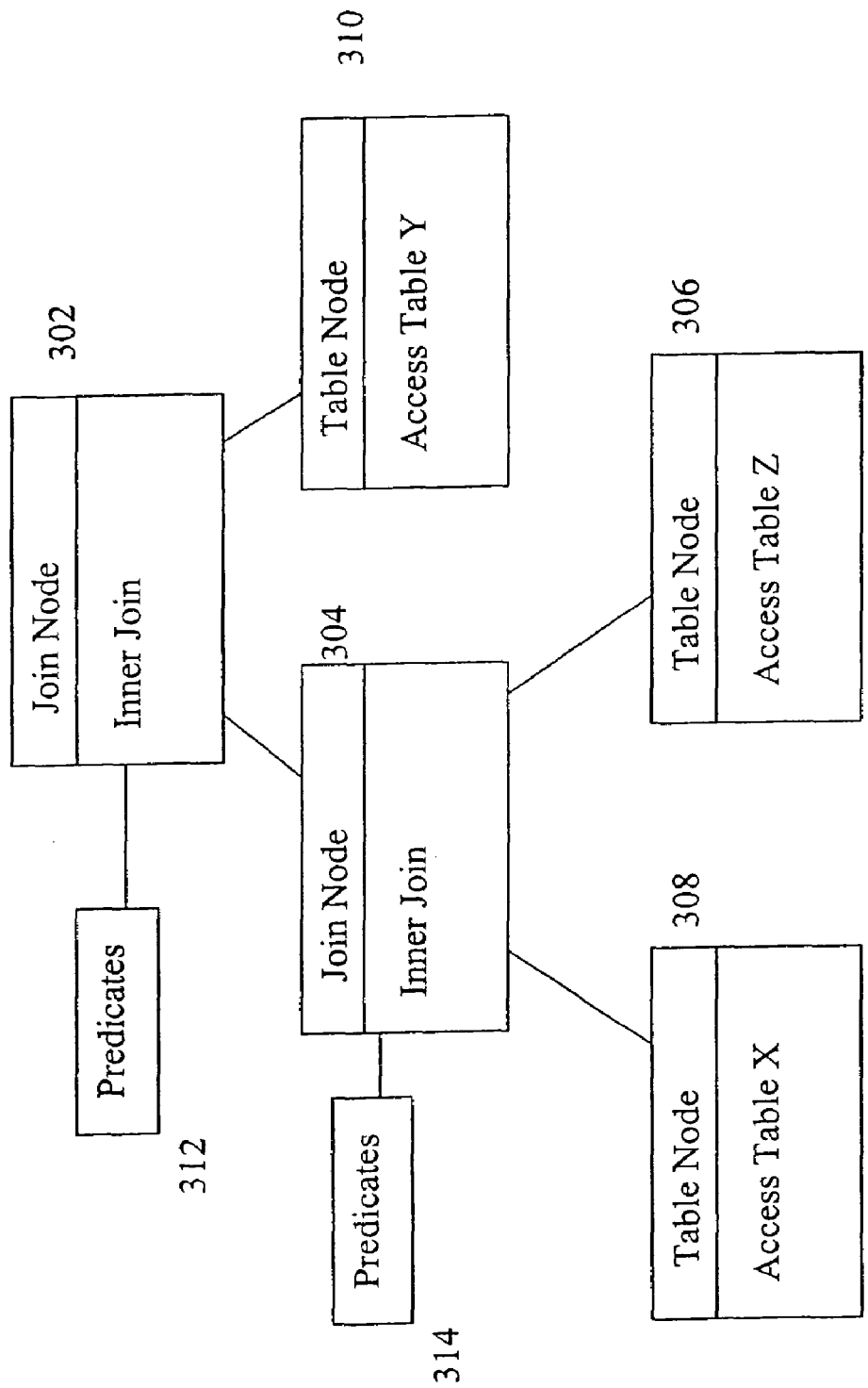
FIG. 4 illustrates an exemplary tree graph representing the multi-join query of FIG. 3 but having a different join order.

Thus from a performance standpoint, it would be better to perform the joins in a different order. If table X is joined with table Z first, as shown in FIG. 4, then, because of the X-Z fan-in, table Y is never accessed. Returning to FIG. 3, the join order depicted is table X to table Y, first, and then table X to table Z. To change this join order, the right child node of join node 304 is changed to become table Z 306 and the right child node of top join node 302 is changed to become table Y. The respective selection criteria 312, 314 are changed as well. As long as this switch is performed between the time that join node 304 completes processing for a particular record of table X and starts to retrieve the next record, the switch of these child nodes can occur without risking data integrity and with almost no performance cost or overhead.

One of ordinary skill will recognize that a tree graph, with parent and child nodes, is merely a logical representation of a query plan that aids in understanding how a database engine will execute a particular query. However, the query plan generated by the optimizer will usually comprise proprietary code understandable and executable by the database engine. This code does not specifically require parent nodes and child nodes but, instead, includes logic that is easily represented by a tree graph model having such nodes and connections and can be implemented as other types of data structures as well. Accordingly, while embodiments of the present invention are more easily understood by referring to tree graph terminology, and, thus, have been described herein using such terminology, these embodiments do not require actual creation and modification of a tree graph.

With the above description in mind, a general method and system for providing dynamic join reordering according to embodiments of the present invention can be presented and more easily appreciated.

Dynamic Join Reordering

Figure 5:
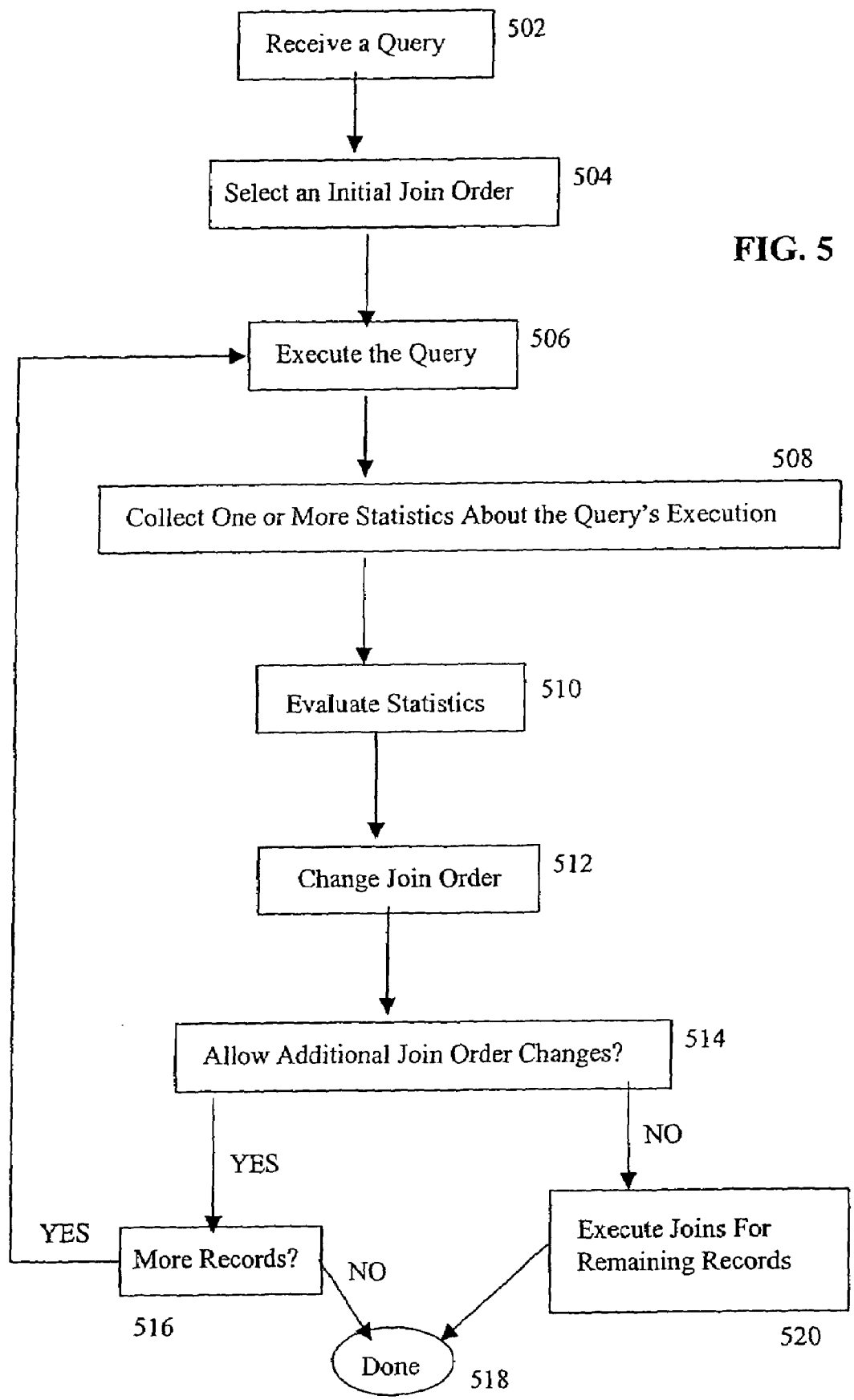
FIG. 5 depicts a flowchart for performing dynamic join reordering according to embodiments of the present invention.

FIG. 5 depicts an exemplary method for dynamically changing join order during query execution which can operate within the exemplary environment of FIGS. 1 and 2. According to this flowchart, an execution engine will receive, in step 502, a query from an optimizer as part of a query plan. This query will include an indication of the initial join order which the execution engine selects, in step 504, to start the query.

The optimizer can determine when a query is a candidate for being eligible to have dynamic changes to join order performed during runtime, or execution. The optimizer then labels the query, or otherwise provides an indication to the database execution engine, that this particular query should be executed within a framework where dynamic changes to join order can occur.

Certain characteristics about queries result in more potential performance increase as compared with other queries. For example, joins involving table sizes around a few hundred records would see little performance benefit perceptible to a user. Thus, the optimizer would likely suggest a static join order using conventional algorithms. Similarly, if table Y has an average join duplicates of "2" while that of table Z is "100", then the optimizer may rule out the possibility that performing X to Z before X to Y would ever be allowed. Instead, the optimizer would set the join order without indicating that dynamic join order changes are permitted. Similarly, if one table was far larger than the other, the join order could be static and set during optimization. In contrast to these outlying examples, there are many queries for which it is unclear whether they may or may not benefit from changing the join order dynamically during runtime. It is these equivocal instances which have the potential to benefit from dynamic join reordering.

Accordingly, embodiments of the present invention can use no pre-execution join order optimization or could continue to apply traditional optimization rules for determining join order before runtime. However, if application of these rules generate equivocal results, then the query is identified as one in which join order can be dynamically changed during runtime. An example of equivocal results is the exemplary table Y and Z presented earlier in which the average number of duplicates and table size were the same. As these are the values used by conventional, pre-execution join ordering, they are unhelpful in predicting the best join order. One of ordinary skill will appreciate that exact equality is not needed when comparing characteristics of two tables but that similarities, e.g., within an order of magnitude, may be sufficient to classify a query as potentially benefitting from changing join order during runtime.

In step 506, the execution engine runs the query using the initial join order and, while running the query, collects statistics, in step 508, about the how the different join operations of the query behave during execution.

Useful statistics can include data such as a) the number of records retrieved so far from table X; b) the number of records discarded, or non-selected, by operation of the X to Y join (i.e., fan-in); c) the number of records discarded, or non-selected, by operation of the X to Z join (i.e., fan-in); d) the fan-out results of the X to Y join; and e) the fan-out results of the X to Z join.

A larger fan-in number (more selective) indicates that a join node is not identifying as many matching records as a join node with a lower fan-in number. Conversely, a larger fan-out result is indicative that a join is less selective than another having fewer fan-outs. Thus, from these data, the database engine can determine at runtime which join node appears to be more selective than the other for the particular query being executed. To increase query runtime performance, the more selective join can be performed first.

In step 510, the execution engine evaluates the statistics to determine if a different join order would result in a more selective join being performed earlier thereby providing increased performance.

The specific number of records from Table X to retrieve before evaluating the collected statistics can be predetermined as a set value or can be dependent on the tables size (e.g., 10%). However, a more dynamic approach would utilize known probability theory to evaluate the number of records retrieved along with the exhibited variance to determine if the collected data is statistically significant. By evaluating the number of records retrieved from table X, the database engine can determine, based on traditional probability theory, if enough data has been collected, and what variance between the collected values is needed, to provide statistical significance. Once reliable statistical data has been acquired, the database engine can identify the better join order and change it if necessary.

If so determined, the execution engine can change the join order in step 512.

The execution engine can be configured in step 514 to use the new join order (or the now-validated initial join order) to continue executing the query, in step 520, so that all the records are handled. Thus, once a join order has been selected, the database engine can stop keeping statistics and let the query complete using the selected join order.

However, according to other embodiments of the present invention, even after the database engine selects a join order, it can continue to keep statistics of the different join operations. These statistics can be reset from when the current join order was selected or can reflect data on all records processed since the beginning of the query's execution. Thus, during the continued running of the query, the database engine can determine if the current join order, which was previously the better choice, has now become inefficient and should be changed. For a query involving tables with large numbers of records, the join order can be changed more than once while the query executes.

In terms of the flowchart of FIG. 5, the execution engine determines, in step 514, if multiple join order changes are permitted and, if there are more records that need processing, in step 516, then the query is executed with statistics continuing to be collected in step 508.

Execution Engine

Figure 6:
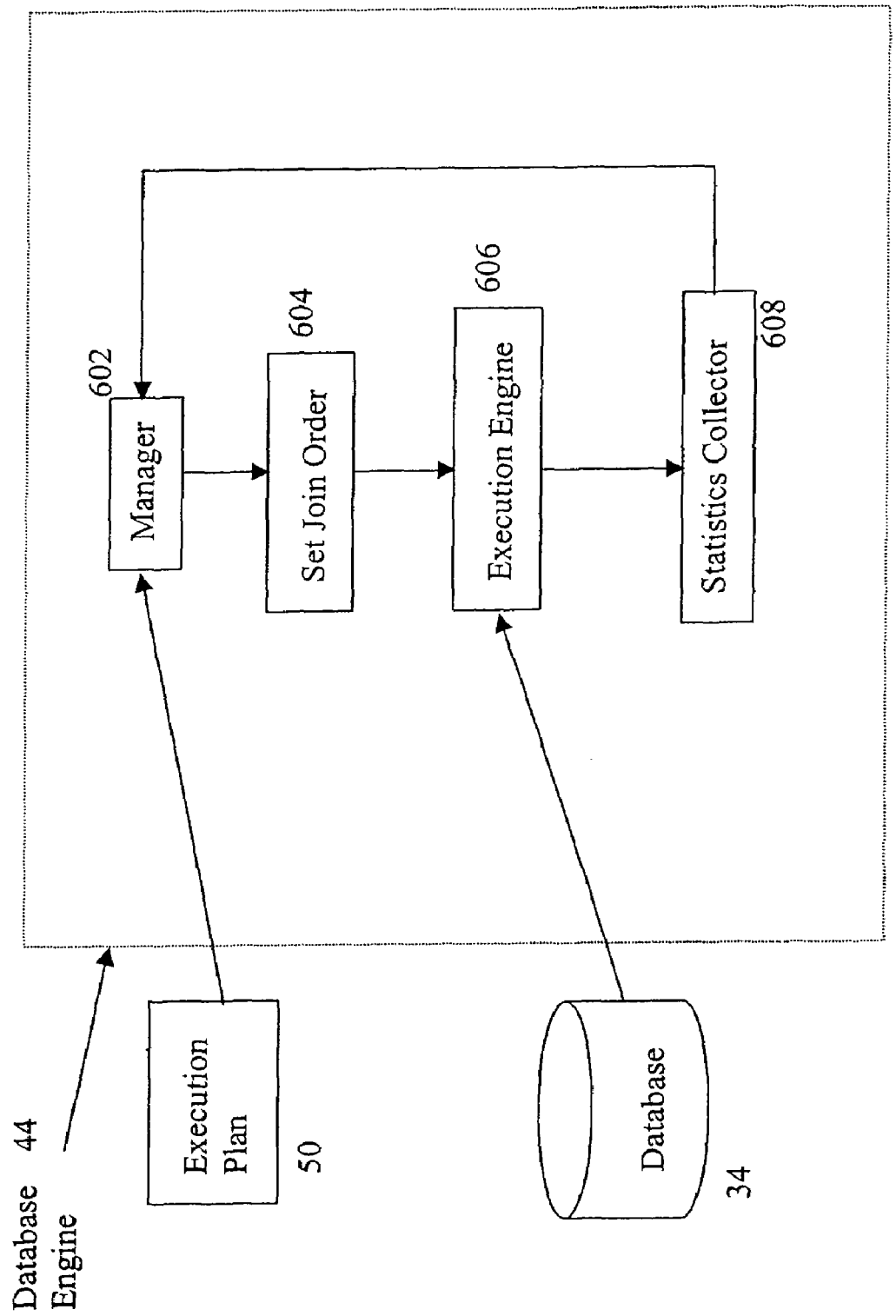
FIG. 6 illustrates an exemplary database engine according to embodiments of the present invention.

FIG. 6 depicts a more detailed view of an exemplary database engine 44 that can perform the method described above in relation to FIG. 5. The database engine 44 includes a manager 602 that evaluates the execution plan 50 to determine an initial join order and whether the query is a candidate for dynamic join order updating. Under the control of the manager 602, the database engine 44, includes logic 604 to set the join order for the query. Once the join order is set, the execution engine 606 executes the query in order to return a result set of matching records to a user from the database 34. While the query is executing, a statistics collector 608 is tracking how each join operation is performing. The statistics collector 608, can track fan-in statistics for each join operation in the query, can track fan-out statistics for each join operation in the query, or track some combination or sub-combination thereof. These statistics are provided to the manager 602 to determine if a new join order should be set in an attempt to increase query execution performance.

Additional Join Types

Figure 8:
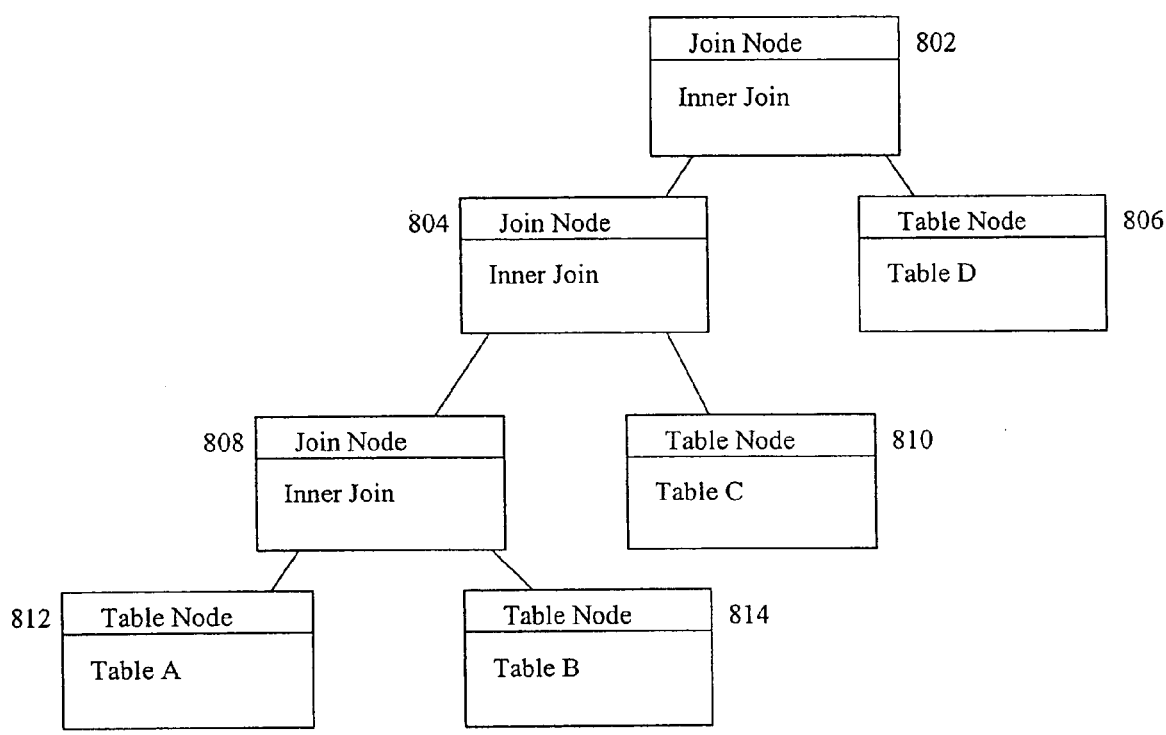
FIG. 8 illustrates a tree graph of an exemplary multi-join query involving more than three tables.

Embodiments of the present invention are not limited to joins involving only three tables. One of ordinary skill will appreciate that the following SQL query:

---
SELECT * from A, B, C, D
WHERE A.j1 = B.j1 AND A.j2 = C.j2 AND A.j3 = D.j3
--- depicted in the tree graph of FIG. 8 can also benefit from dynamic detection of fan-in and join reordering during runtime. In this instance, fan-in, and possibly fan-out, statistics of 3 different joins 802, 804, 808 are maintained to determine their relative selectiveness. In operation, the database engine would reorder the child nodes 806, 810, 814 so that the most selective would be a child node to the bottom join node 808 and the least restrictive would be a child node of the top join node 802.

Exemplary queries have been presented herein which include Inner Joins. However, these queries are exemplary in nature only and a number of other Join types can also benefit from the techniques described herein. Some Join types, such as a Left Outer Join, are not associative; that is $((X \rightarrow Y) \rightarrow Z)$ is not equivalent to $(X \rightarrow (Y \rightarrow Z))$. Even in these instances, however, many query optimizers try to replace some Outer joins with Inner joins when generating an access plan for the query in order to improve performance and simplify optimization. Thus, embodiments of the present invention benefit a wide-variety of Join types that can be re-written as Inner Joins.

Figure 9:
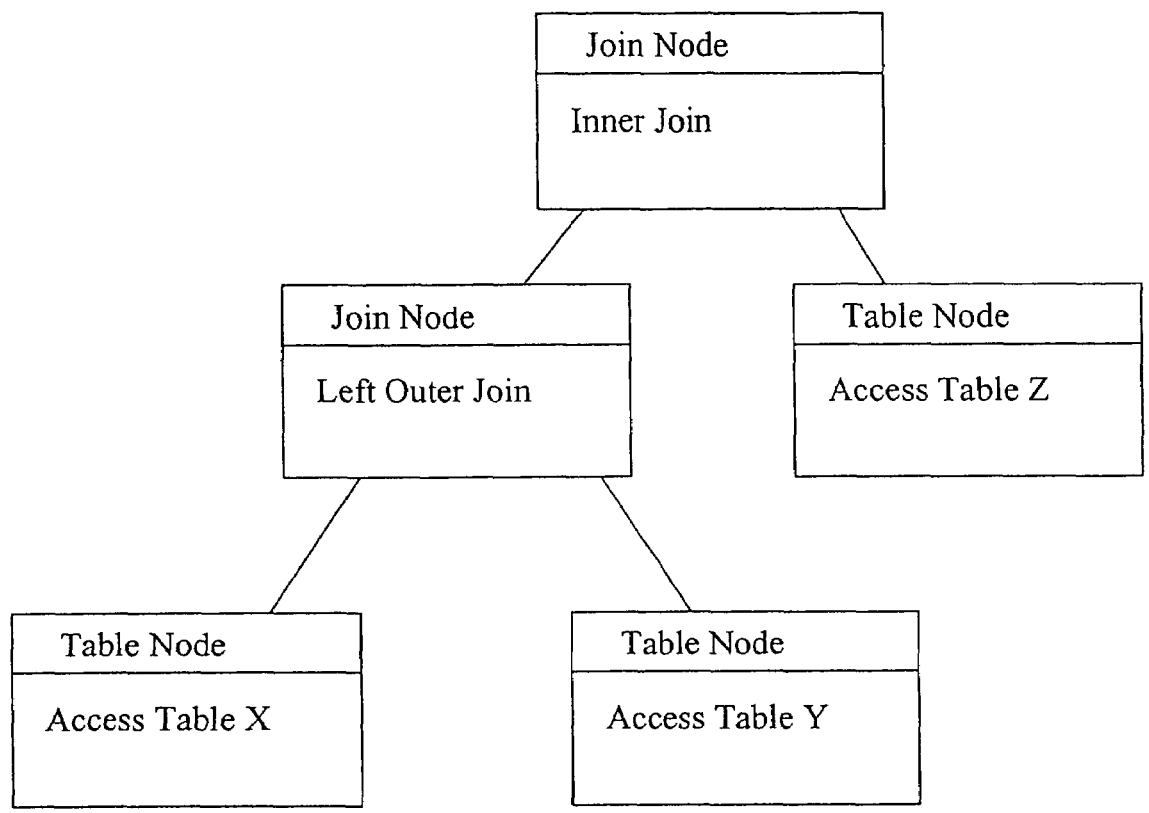
FIG. 9 illustrates a tree graph of an exemplary query of a query involving different types of join operations.
Figure 10:
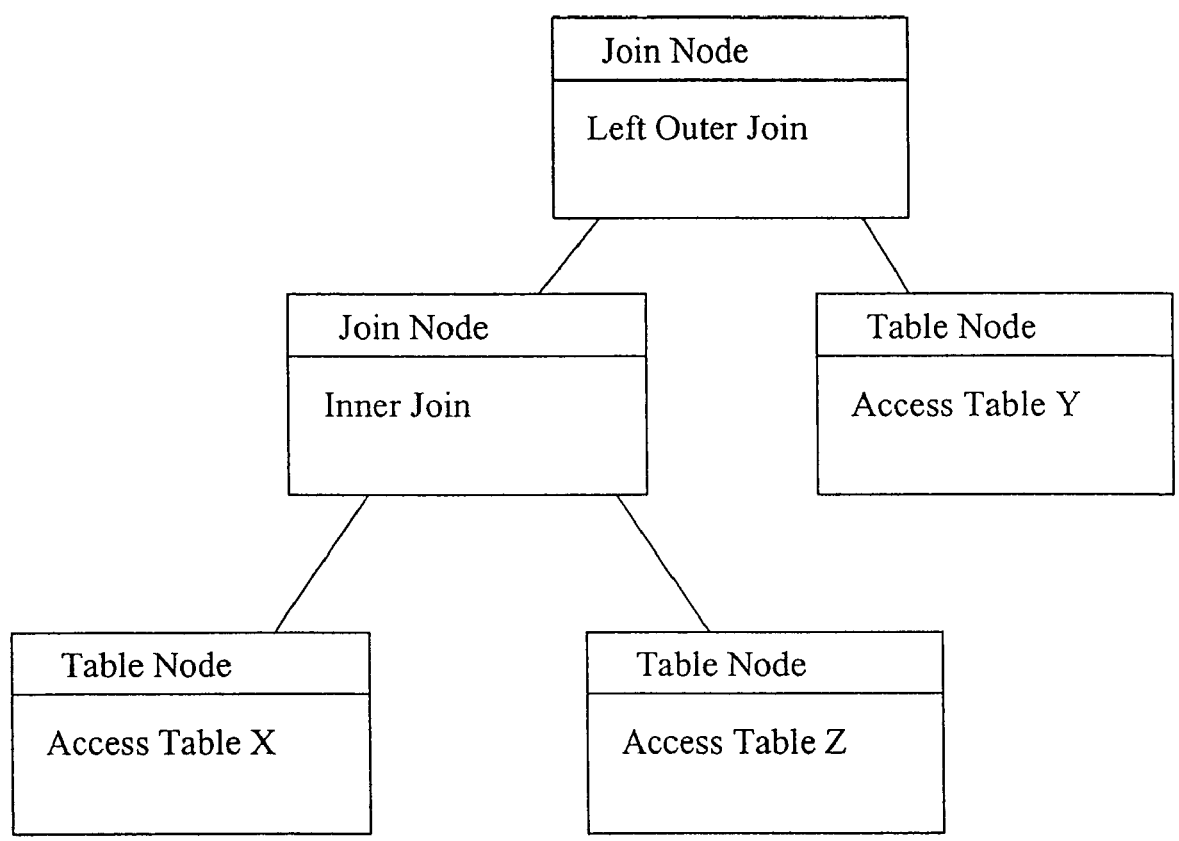
FIG. 10 illustrates a tree graph of the query of FIG. 9 but with a different join order.

Additionally, one of ordinary skill will recognize that different combinations of joins other than merely Inner Joins have associative properties such as that depicted in FIG. 9. The exemplary tree graph of FIG. 9 depicts a join operation of X LeftJoin Y, X InnerJoin Z which can have its join order changed to X InnerJoin Z, X LeftJoin Y, as depicted in FIG. 10. Accordingly, the join order for a wide variety of queries can be dynamically changed during runtime without changing the result set presented to the user.

Subsequent Queries

The statistics being gathered can be beneficial to queries other than the currently executing query. For example, according to certain embodiments of the present invention, the statistics can be stored in non-volatile memory accessible by the optimizer in an indexed or searchable manner. Thus, when the optimizer encounters a query, it can scan the statistics to determine if any previously involved the same tables or columns used in the current query. These statistics could then be used to select an initial join order rather than randomly selecting one or selecting one according to only traditional optimizer algorithms.

Heuristic Learning

As indicated before, the sample size of records selected from table X before a join order is evaluated can be a predetermined number. In particular, a sample size is selected that is anticipated to be large enough to provide confidence that the decision regarding join order is correct.

Therefore, according to embodiments of the present invention, once the entire query completes execution, the statistics of the sample size can be compared with the statistics for the entire query. If the fan-in or fan-out statistics are significantly different between the two, then the sample size was likely too small and can be increased. If they are similar, then the sample size can be decreased in an effort to converge at the smallest sample size that provides a good indicator for determining the better join order. As more and more queries are performed, the execution engine can learn what sample size is optimal for the particular platform and system settings of its specific environment. Thus, while the sample size is a predetermined number, the database engine can periodically adjust this predetermined number as needed.

Various modifications may be made to the illustrated embodiments without departing from the spirit and scope of the invention. Therefore, the invention lies in the claims hereinafter appended.

What is claimed is:

1. A computer-implemented method for monitoring a query during runtime, said query involving a plurality of join operations, the method comprising the steps of:

wherein the plurality of join operations include a first join that includes a first table and a second table and a second join that includes the first table and a third table;

running the query according to a first join order;

generating a first portion of a result set for the query while running the query according to the first join order, including adding to the result set a first record that matches the plurality of join operations in the query;

concurrent with running the query, collecting performance statistics about each of the join operations;

dynamically changing the first join order, during running of the query, to a second join order based on the statistics;

where said dynamically changing the first join order, during running of the query, to a second join order based on the statistics comprises:

determining respective fan-in statistics for the first join and second join; and dynamically changing the first join order to the second join order if the respective fan-in statistics indicate that the second join is more likely to cause fan-in than the first join; and generating a second portion of the result set for the query while running the query according to the second join order, including adding to the result set a second record that matches the plurality of join operations in the query such that the result set includes at least the first and second records, the first and second portions of the result set generated for the same execution of the query.

2. The method according to claim 1, further comprising the step of:

collecting additional statistics about each of the join operations after the first join order is changed to the second join order.

3. The method according to claim 2, further comprising the step of:

changing the second join order to either the first join order or a third join order based on the additional statistics.

4. The method according to claim 1, further comprising the steps of:

determining respective fan-out statistics for the first join and the second join; and dynamically changing the first join order to the second join order based on a combination of the respective fan-in and fan-out statistics.

5. The method according to claim 1, comprising the steps of:

identifying a predetermined sample size;

performing the step of collecting statistics for the predetermined sample size;

evaluating the collected statistics; and dynamically changing the first join order to the second join order based on the collected statistics.

6. The method according to claim 5, comprising the steps of:
   collecting additional statistics for substantially all of the query;
   comparing the additional statistics with the collected statistics; and
   adjusting the predetermined sample size, for use by a subsequent query, according to results of the comparing step.

7. The method according to claim 1, further comprising the steps of:
   running another query after the query; and
   selecting an initial join order for the other query based on the collected performance statistics.

8. A computer-implemented method for monitoring a query during runtime, said query involving a plurality of join operations, the method comprising the steps of:
   wherein the plurality of join operations include a first join that includes a first table and a second table and a second join that includes the first table and a third table;
   running the query according to a first join order;
   generating a first portion of a result set for the query while running the query according to the first join order, including adding to the result set a first record that matches the plurality of join operations in the query;
   concurrent with running the query, collecting performance statistics about each of the join operations;
   dynamically changing the first join order, during running of the query, to a second join order based on the statistics;
      where said dynamically changing the first join order, during running of the query, to a second join order based on the statistics comprises:
         determining respective fan-out statistics for the first join and the second join; and
         dynamically changing the first join order to the second join order if the respective fan-out statistics indicate that the second join is less likely to cause fan-out than the first joint; and
   generating a second portion of the result set for the query while running the query according to the second join order, including adding to the result set a second record that matches the plurality of join operations in the query such that the result set includes at least the first and second records, the first and second portions of the result set generated for same execution of the query.

* * * * *